United States Patent
Bellikka

(10) Patent No.: US 10,471,584 B2
(45) Date of Patent: Nov. 12, 2019

(54) TOOL SYSTEM INCLUDING NON-CONTACT POSITIONING DEVICE

(71) Applicant: Ford Motor Company, Dearborn, MI (US)

(72) Inventor: Glen Bellikka, Dexter, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 15/937,217

(22) Filed: Mar. 27, 2018

(65) Prior Publication Data

US 2019/0299394 A1 Oct. 3, 2019

(51) Int. Cl.
| A47F 5/00 | (2006.01) |
| B25H 1/00 | (2006.01) |
| F16L 3/015 | (2006.01) |
| F16M 13/02 | (2006.01) |

(52) U.S. Cl.
CPC ............ B25H 1/0021 (2013.01); F16L 3/015 (2013.01); F16M 13/022 (2013.01)

(58) Field of Classification Search
CPC ... A47F 5/0838; B60R 2011/0028; F16L 3/24
USPC .................................. 248/317, 323, 339, 340
See application file for complete search history.

(56) References Cited

U.S. PATENT DOCUMENTS

| 1,814,692 | A | * | 7/1931 | Harris ...................... A47J 47/16 |
| | | | | 211/123 |
| 4,314,646 | A | * | 2/1982 | Purnell ................... A47G 7/045 |
| | | | | 211/113 |
| 7,567,159 | B2 | | 7/2009 | Macken |
| 7,766,290 | B1 | * | 8/2010 | Bradbury ................ A47J 45/02 |
| | | | | 248/200.1 |
| 9,254,050 | B1 | * | 2/2016 | Bradbury .............. A47F 7/0064 |
| 9,447,617 | B2 | | 9/2016 | Smith |
| 10,299,569 | B1 | * | 5/2019 | Taylor .................... A45D 44/06 |
| 2011/0253504 | A1 | * | 10/2011 | Hazenbroek ....... A22C 21/0053 |
| | | | | 198/375 |

FOREIGN PATENT DOCUMENTS

| CN | 202245752 | 5/2012 |
| CN | 103365334 | 10/2013 |
| CN | 205820733 | 12/2016 |
| NL | 1034479 | 4/2009 |

OTHER PUBLICATIONS

Marine Education: Safeties in Engine Room Crane!, Jul. 2016, available at URL http://marineexam.blogspot.in/2016/07/safetiesinengineroomcrane.html.

* cited by examiner

*Primary Examiner* — Steven M Marsh
(74) *Attorney, Agent, or Firm* — Burris Law, PLLC

(57) ABSTRACT

A tool system includes a rail, a trolley, a tool, a detent, and a target. The trolley is translatable between first and second positions along the rail. The tool is secured to the trolley. The detent includes a magnet. One of the target and the magnet is located at a third position along the rail, between the first and second positions. The other one of the target and the magnet is coupled to the trolley. The magnet and target cooperate to resist trolley movement away from the third position.

20 Claims, 6 Drawing Sheets

TOOL SYSTEM INCLUDING NON-CONTACT POSITIONING DEVICE

FIELD

The present invention relates to tool system positioning devices, and more specifically to non-contact tool system positioning devices.

BACKGROUND

The statements in this section merely provide background information related to the present disclosure and may not constitute prior art.

Some tools in assembly plants are mounted on rails or tracks that allow an operator to move the tool along that rail. Other tools are similarly attached to the rail by a lead line (e.g., an electric supply cable, a pneumatic supply cable, or a leash) that allows limited movement of the tool within a predetermined distance from the rail while being generally movable along the length of the rail. One such example is an electric torque driver used on a moving production line. The torque driver can have an electrical power lead that is coupled to a trolley that rolls along the rail within a preset length of the assembly line. The operator may need to use the tool at different locations within that preset length of the assembly line and may need to let go of the tool to perform other tasks. However, operators can have difficulty with the tool drifting out of position when the tool is not held by the operator. The tool can drift out of position due to tension in festooning, gravity, friction, wind, the operator bumping the tool, contact with the moving assembly line, or any number of events.

The issue of rail supported tooling drifting out of place in assembly lines has been ongoing. Some efforts have been made to address this problem, but these efforts typically involve a complex and costly mechanism that rigidly locks the tool in a single location until the operator deactivates the lock. Such locks suffer from a number of drawbacks including being complex and costly, having parts that wear down, or lacking adjustability of positioning and/or hold characteristics. These issues with tool positioning are addressed by the device present teachings.

SUMMARY

In one form, a tool system includes a rail, a trolley, a tool, a detent, and a target. The trolley is translatable between first and second positions along the rail. The tool is secured to the trolley. The detent includes a magnet. One of the target and the magnet is located at a third position along the rail, between the first and second positions. The other one of the target and the magnet is coupled to the trolley. The magnet and target cooperate to resist trolley movement away from the third position.

According to a further form, the magnet does not contact the target when the trolley is in the third position.

According to a further form, the detent includes a bracket and the magnet is mounted to the bracket. The rail extends longitudinally along a rail axis and the bracket is configured to be adjustable between a first bracket position and a second bracket position. When in the second bracket position the bracket supports the magnet a greater distance from the rail axis than when in the first bracket position.

According to a further form, the target is mounted to the trolley. The detent includes a fastener that couples the bracket to the rail. The bracket defines a slot and the rail includes a nut. The fastener is received through the slot and threadably engaged with the nut.

According to a further form, the target is mounted to the rail. The bracket includes a threaded shaft and a nut. The threaded shaft supports the magnet. Relative rotation between the threaded shaft and the nut translates the magnet relative to the trolley in a direction toward or away from the rail axis.

According to a further form, the target includes a bracket and a ferromagnetic target member. The rail extends longitudinally along a rail axis and the bracket is configured to be adjustable between a first bracket position and a second bracket position. When in the second bracket position, the bracket supports the target member a greater distance from the rail axis than when in the first bracket position.

According to a further form, the detent is mounted to the trolley. The target includes a fastener that couples the bracket to the rail. The bracket defines a slot and the rail includes a nut. The fastener is received through the slot and threadably engaged with the nut.

According to a further form, the detent is mounted to the rail. The bracket includes a threaded shaft and a nut. The threaded shaft supports the target member. Relative rotation between the threaded shaft and the nut translates the target member relative to the trolley in a direction toward or away from the rail axis.

According to a further form, the rail extends longitudinally along a rail axis and the rail defines a channel extending longitudinally along the rail axis. The channel is open on a first side of the rail. The trolley includes a plurality of wheels and a support body. The wheels are disposed within the channel and coupled to the support body for rotation relative to the support body. The support body extends from the channel through the first side of the rail. The tool is coupled to the support body.

According to a further form, the one of the target and the detent is located within the channel.

According to a further form, the rail is an I-beam.

According to a further form, the rail extends longitudinally along a rail axis. The target includes a ferromagnetic main portion and a ferromagnetic transition portion. The main portion extends generally parallel to the rail axis. The transition portion is fixedly coupled to an end of the main portion and extends therefrom in a direction away from the rail axis.

According to a further form, the target includes a magnet configured to interact with the magnet of the detent when the trolley is in the third position.

According to a further form, the tool system further includes a lead secured to the trolley. The tool is secured to an end of the lead.

According to a further form, the tool system further includes a second trolley translatable along the rail. The lead is attached to the second trolley.

According to a further form, a first end of the lead is secured to the tool, a second end of the lead is fixed relative to the rail, and the lead is attached to the trolley at an intermediate portion of the lead.

In another form, a tool system includes a rail, a trolley, a lead, a tool, a magnet, a ferromagnetic target member, and a first bracket. The rail extends longitudinally along a rail axis. The trolley is coupled to the rail and translatable along the rail between a first position along the rail and a second position along the rail. The lead is attached to the trolley. The tool is secured to the lead. The first bracket is coupled to the rail at a third position along the rail, the third position being between the first and second positions. The first bracket supports one of the target member and the magnet and is adjustable between a first bracket position and a second bracket position. In the first bracket position, the one of the target member and the magnet is a first distance from the rail axis. In the second bracket position, the one of the target member and the magnet is a second distance from the rail axis. The other one of the target member and the magnet is coupled to the trolley. The magnet and the target member cooperate to magnetically resist movement of the trolley away from the third position along the rail.

According to a further form, the tool system further includes a plurality of fasteners that secure the first bracket to the rail. The first bracket defines a slot and the rail includes a nut. The fasteners are threadably engaged with the nut.

According to a further form, the tool system further includes a second bracket coupled to the trolley and supporting the other one of the target member and the magnet. The second bracket is adjustable to move the other one of the target member and the magnet between a third distance from the rail axis and a fourth distance from the rail axis.

According to a further form, the second bracket includes a threaded shaft and a nut. The threaded shaft supports the other one of the target member and the magnet. Relative rotation between the threaded shaft and the nut translates the other one of the target member and the magnet relative to the trolley in a direction toward or away from the rail axis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
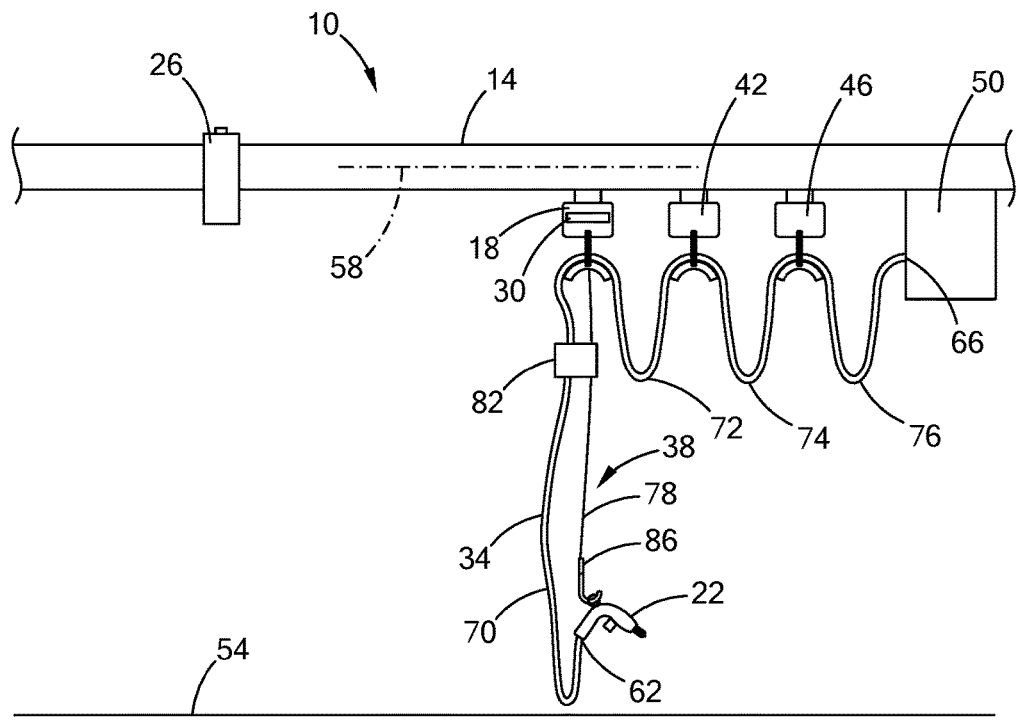
FIG. 1 is a side view of a tool system of a first construction in accordance with the teachings of the present disclosure, illustrating a trolley of the tool system in a first position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a tool system 10 includes a rail 14, a first trolley 18, a tool 22, a positioning device or detent 26, and a target 30. In the example provided, the tool system 10 also includes a lead 34, a support device 38, a second trolley 42, a third trolley 46, and a controller or power supply 50. The rail 14 generally supports the first, second, and third trolleys 18, 42, 46 for movement (i.e., translation) along the rail 14 and the tool 22 is connected to the first trolley 18 for movement along the rail 14 in conjunction with the first trolley 18. In the example provided, the rail 14 is suspended above the ground 54 and is overhead of a typical human operator (not shown) so as to be generally out of the way while supporting the tool 22 hanging from the rail 14 as described in greater detail below. In the example provided, the rail 14 is hung from a ceiling (not shown) or other support structure (not shown). In an alternative configuration, not specifically shown, the rail 14 can be located on or proximate to the ground 54 and the tool 22 can be supported above the rail 14 by a support (not shown) mounted to the trolley (e.g., a rigid support or a torque tube).

The rail 14 extends longitudinally along a rail axis 58. In the example provided, the rail axis 58 is a straight axis that is parallel to the ground 54, though other configurations can be used. In one alternative configuration, not specifically shown, the rail 14 can be curved such that the rail axis 58 curves to allow the trolleys 18, 42, 46 and the tool 22 to move along a curved path. In another alternative configuration, not specifically shown, the rail 14 can be angled relative to the ground 54.

Returning to the example shown, the lead 34, also referred to as a festoon, has a first end 62 and a second end 66. The first end 62 of the lead 34 is secured to the tool 22 and is configured to provide power to the tool 22. In the example provided, the tool 22 is an impact driver, though other types of tools can be used (e.g., welder, rivet gun, nail gun, staple gun, screw driver, scanner, fixture for supporting vehicle parts for movement along an assembly line, container for holding objects, safety support harness for arresting falling objects or people, etc.). In the example provided, the tool 22 is an electric tool and the lead 34 is a cable configured to provide electric power received from the power supply 50, though other types of tools, leads, and power supplies can be used (e.g., pneumatic power tool, lead, and power supply).

The second end 66 of the lead 34 is connected to the power supply 50. Intermediate locations on the lead 34 (i.e., between the first and second ends 62, 66) are supported by the first, second, and third trolleys 18, 42, 46, with the third trolley 46 being closest to the power supply 50 and the second trolley 42 being between the first trolley 18 and the third trolley 46. The intermediate locations of the lead 34 are spaced apart along the length of the lead 34 so that the tool 22, first trolley 18, second trolley 42, third trolley 46, and power supply 50 define bounds of first, second, third, and fourth intermediate portions 70, 72, 74, 76 of the lead 34. The first intermediate portion 70 can hang from the first trolley 18 and connect to the tool 22. The second intermediate portion 72 can hang between the first trolley 18 and the second trolley 42. The third intermediate portion 74 can hang between the second trolley 42 and the third trolley 46. The fourth intermediate portion 76 can hang between the third trolley 46 and the power supply 50. In the example provided, the power supply 50 is mounted to the rail 14, though other configurations can be used, such as being mounted to the ground 54 or mounted to a structure fixed relative to the rail 14. While three trolleys are provided in the example shown, additional or fewer trolleys can be used, effectively resulting in additional or fewer intermediate portions of the lead 34.

The support device 38 includes a support cable 78, a support block 82 also referred to as a waterfall, and a tool mount 86. One end of the support cable 78 is attached to the first trolley 18. The other end of the support cable 78 is attached to the tool mount 86 so that the tool mount 86 hangs from the first trolley 18. The support cable 78 is a length configured so that the tool mount 86 hangs above the ground 54, but within easy reach of the operator (not shown). The support block 82 is attached to the support cable 78 at a location generally more toward the first trolley 18 than the tool mount 86, i.e., within the top half of the support cable 78. The support block is also attached to the first intermediate portion 70 of the lead 34. The tool mount 86 is configured to detachably support the tool 22 above the ground 54. In the example provided, the first intermediate portion 70 of the lead 34 is long enough that it hangs below the tool mount 86 when the tool is attached to the tool mount 86. In the example provided, the tool mount 86 is a hook and the tool 22 includes a loop configured to receive the hook of the tool mount 86 so that the operator (not shown) can easily attach and remove the tool 22 from the tool mount 86.

Figure 2:
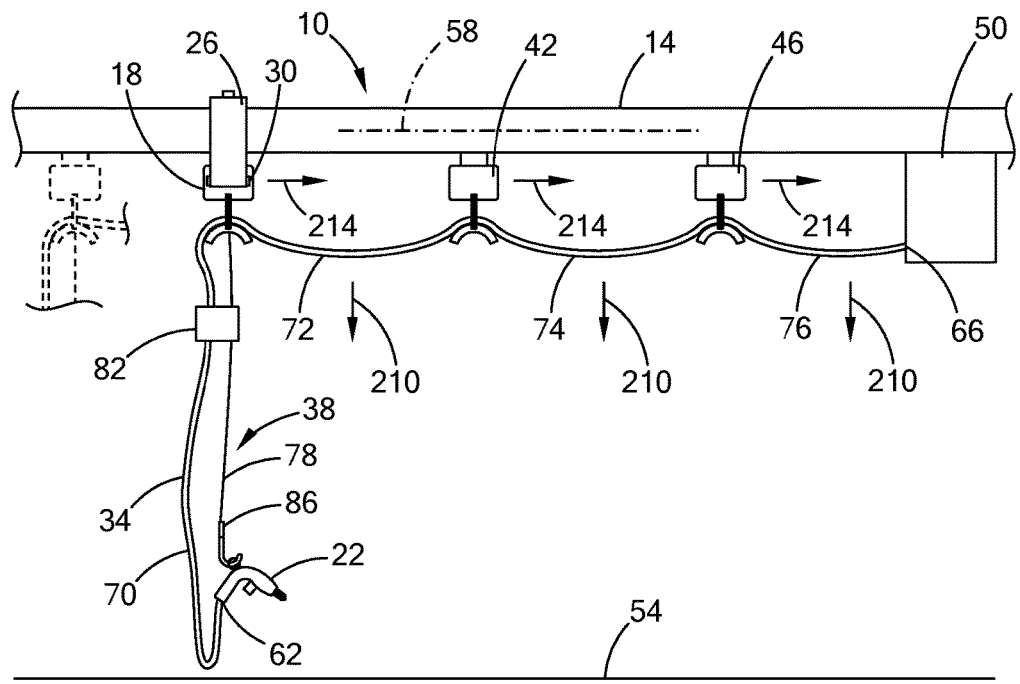
FIG. 2 is a side view similar to FIG. 1, illustrating the trolley of FIG. 1 in a detent position.

With continued reference to FIG. 1 and additional reference to FIG. 2, the detent 26 is mounted at a predetermined detent location along the rail 14 that is within the travel range of the first trolley 18. In the example provided, the first trolley 18 is movable between a first position (as shown in FIG. 1) that is between the power supply 50 and the detent 26, and a second position (as shown in dashed lines in FIG. 2) wherein the detent 26 is between the second position and the power supply 50. The first trolley 18 is shown in solid lines in FIG. 2 at the detent position also referred to as a third or intermediate trolley position.

In the example provided, the detent 26 is mounted to the rail 14. In an alternative configuration, not specifically shown, the detent 26 can be mounted to the ceiling or another support structure that is fixed relative to the rail 14. The target 30 is attached to the first trolley 18 and is configured to magnetically interact with the detent 26 when the first trolley 18 is at the detent position. In the example provided, the detent 26 and target 30 interact without contacting each other and interact in a manner that inhibits movement of the first trolley 18 away from the detent position.

As shown in FIG. 2, when the first trolley 18 is in the detent position, the weight of the lead 34 can create downward forces (shown by arrows 210) that can create net horizontal forces (shown by arrows 214) on the trolleys 18, 42, 46 that can draw the trolleys 18, 42, 46 toward the power supply 50. In other words, the lead 34 can act to bias the first trolley 18 toward the first trolley position shown in FIG. 1. As such, when the first trolley 18 is in the second trolley position (shown in dashed lines in FIG. 2), the lead 34 can cause the first trolley 18 to start to move toward the first trolley position (shown in FIG. 1) when the tool is not held by the operator (not shown). Similarly, if the tool is bumped with sufficient force when the first trolley 18 is in the first trolley position (FIG. 1), momentum can carry the tool in the direction toward the second trolley position (dashed lines in FIG. 2). Thus, the detent 26 can also act to prevent unintentional over travel of the first trolley 18 and the tool 22 in the direction away from the power supply 50.

The detent 26 and target 30 are configured to interact with each other with sufficient force so as to resist the net horizontal forces from the weight of the lead 34. Thus, the detent 26 and target 30 can hold the first trolley 18 in the detent position. The interaction or holding force between the detent 26 and the target 30 can be such that an operator (not shown) merely bumping into the tool 22 is insufficient to move the first trolley 18 out of the detent position. However, the holding force between the detent 26 and the target 30 is such that the operator (not shown) can intentionally apply enough force to move the first trolley 18 out of the detent position (e.g., to the first or second position). The detent 26 and target 30 are described in greater detail below.

Figure 3:
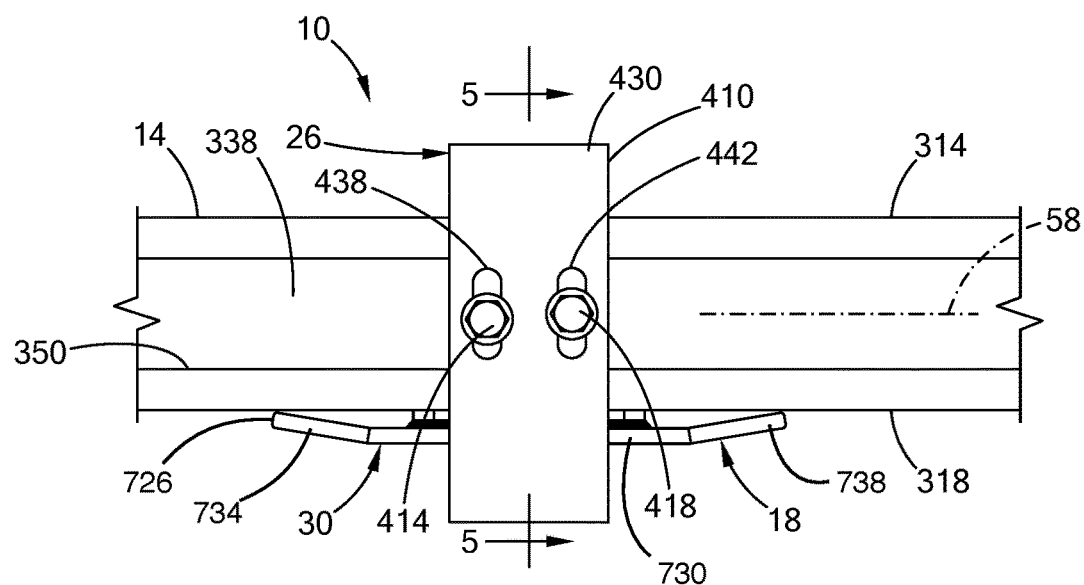
FIG. 3 is a top view of a portion of the tool system of FIG. 1, illustrating the trolley in the detent position.
Figure 4:
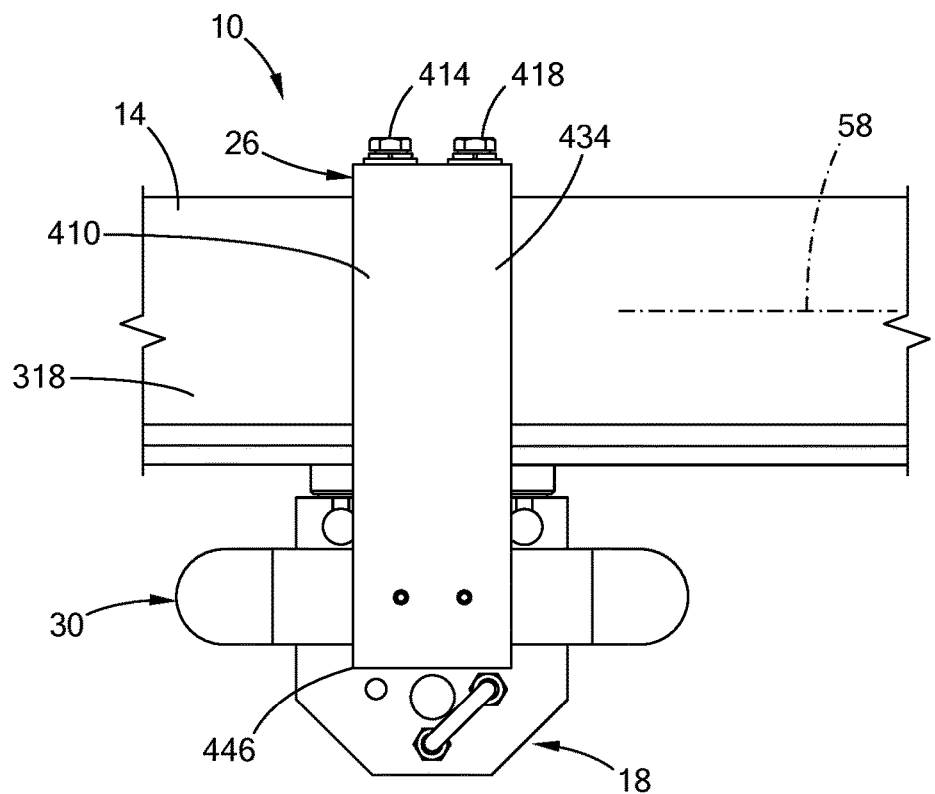
FIG. 4 is a side view of the portion of the tool system shown in FIG. 3.
Figure 5:
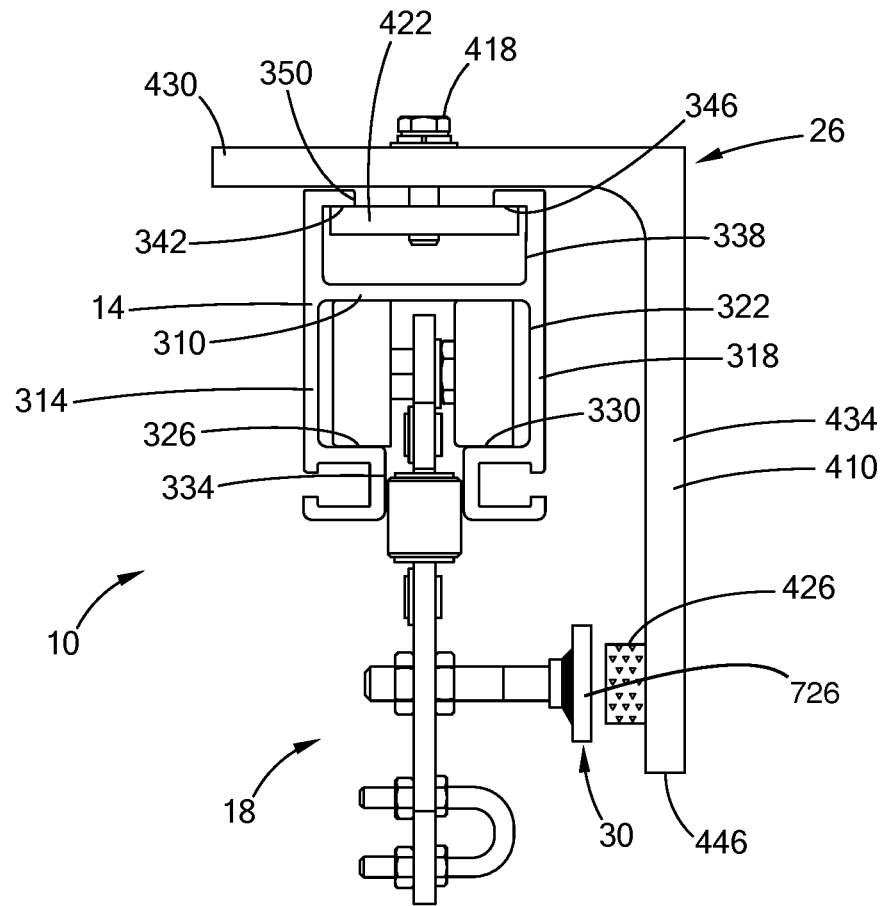
FIG. 5 is a cross-sectional view of the portion of the tool system shown in FIG. 3, taken along line 5-5 shown in FIG. 3.

With additional reference to FIGS. 3-5, the rail 14 can include an upper wall 310 joined to opposite side walls 314, 318. The side walls 314, 318 extend below opposite sides of the upper wall 310 to define a main channel 322 that extends longitudinally along the rail axis 58 and is open along a bottom of the rail 14. The side walls 314, 318 include lower support surfaces 326, 330 that face generally up toward the upper wall 310 and are spaced apart from each other to define an opening 334 of the main channel 322 along the bottom of the rail 14. The main channel 322 is configured to receive a portion of each trolley 18, 42, 46 and the lower support surfaces 326, 330 are configured to support the trolleys 18, 42, 46 while permitting the trolleys 18, 42, 46 to translate along the rail axis 58.

In the example provided, the side walls 314, 318 also extend above the upper wall 310 to define a mounting channel 338 that extends longitudinally along the rail axis 58 and is open along a top of the rail 14. The mounting channel 338 can be configured to engage rail mounts (not shown) that can support the rail above the ground 54 (FIG. 1). In the example provided, the side walls 314, 318 include upper support surfaces 342, 346 that generally face down toward the upper wall 310 and are spaced apart from each other to define an opening 350 of the mounting channel 338 along the top of the rail 14. The rail mounts (not shown) can be received in the mounting channel 338 and engage the upper support surfaces 342, 346, though other means of mounting the rail 14 can be used.

Figure 6:
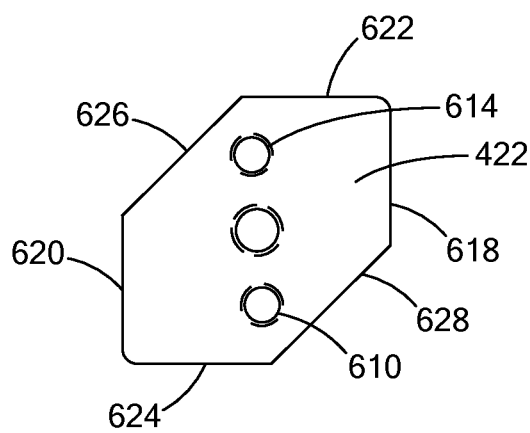
FIG. 6 is a top view of a nut of the tool system of FIG. 1.

With continued reference to FIGS. 3-5 and additional reference to FIG. 6, the detent 26 includes a bracket 410, a first bolt 414, a second bolt 418, a nut 422, and a magnet 426. The magnet 426 is generally mounted to the bracket 410 and the bracket 410 is mounted to the rail 14 to support the magnet 426 below the rail 14 at a predetermined horizontal distance from the rail axis 58. In the example provided, the bracket 410 is a generally "L" shaped body having a first leg 430 and a second leg 434 fixed to the first leg 430. The first leg 430 includes a pair of slots 438, 442 that extend parallel to the longitudinal direction of the first leg 430. The second leg 434 extends from one end of the first leg 430 to a distal end 446 of the second leg 434. In the example provided, the first and second legs 430, 434 are perpendicular to each other. The magnet 426 is mounted to the distal end 446 of the second leg 434. In the example provided, the magnet 426 is a rare-earth permanent magnet, though other types of magnets or electromagnets can be used.

The nut 422 is disposed in the mounting channel 338 of the rail 14 and overlaps with and engages the upper support surfaces 342, 346. The nut 422 includes a pair of threaded bores 610, 614 spaced apart a distance that corresponds to the distance between the slots 438, 442 of the first leg 430 of the bracket 410. In the example provided, the nut 422 has a generally elongated hexagonal shape having sides 618, 620, 622, 624, 626, 628. Sides 618 and 620 are parallel to each other and are spaced apart a distance that is greater than the width of the opening 350 in the mounting channel 338. Sides 622 and 624 are parallel to each other and perpendicular to sides 618 and 620. Sides 626 and 628 are parallel to each other and generally at an angle relative to sides 618, 620, 622, and 624, while being spaced apart a distance that is less than the width of the opening 350 of the mounting channel 338. Thus, the nut 422 is configured such that it can be oriented with the sides 626 and 628 parallel to the opening 350 of the mounting channel 338, then lowered into the mounting channel 338 at a desired location along the rail 14, and then rotated within the mounting channel 338 so that it overlaps with the upper support surfaces 342, 346. When the nut 422 is oriented within the mounting channel 338 to overlap with the upper support surfaces 342, 346, the threaded bores 610, 614 are generally aligned with the rail axis 58, i.e., aligned with the mid-point of the opening 350.

With the nut 422 in the mounting channel 338, the first leg 430 is positioned across the top of the rail 14, i.e., across the opening 350 of the mounting channel 338. A bottom surface of the first leg 430 contacts a top surface of the rail 14. The shaft of the first bolt 414 is placed through the first slot 438 and threaded into the first threaded bore 610 of the nut 422. The shaft of the second bolt 418 is placed through the second slot 442 and threaded into the second threaded bore 614 of the nut 422. The heads of the first and second bolts 414, 418 are larger than the widths of the slots 438, 442 so that tightening the bolts 414, 418 clamps the first leg 430 of the bracket 410 to the rail 14.

With the first leg 430 clamped to the rail 14, the second leg 434 extends down from the first leg 430 so that the second leg 434 is spaced apart from the rail 14 and the distal end 446 of the second leg 434 is generally below the rail 14. The magnet 426 is mounted to the distal end 446 of the second leg 434 such that the magnet 426 is spaced apart from the rail 14 and located generally below the rail 14. In the example provided, the magnet 426 is fixedly mounted to a side of the second leg 434 that faces toward the rail axis 58.

In the example provided, the bracket 410 is mounted to the rail 14 in a manner that allows adjustability of the bracket 410 relative to the rail 14. When the bolts 414, 418 are loosened but still threaded into the nut 422, the first leg 430, the bolts 414, 418, and the nut 422 can slide relative to the rail 14 in the direction along the rail axis 58. The slots 438, 442 extend longitudinally in a direction that is perpendicular to the rail axis 58 so that when the bolts 414, 418 are loosened but still threaded into the nut 422, the first leg 430 can slide relative to the rail 14 and relative to the bolts 414, 418 in the direction perpendicular to the rail 14 in order to position the magnet 426 closer or further from the rail axis 58.

In one alternative configuration, not specifically shown, the slots 438, 442 are replaced with through holes so that the first leg 430 is not adjustable in the direction perpendicular to the rail axis 58. In another alternative configuration, not shown, the bracket 410 can be non-adjustably mounted to the rail 14, such as directly bolted to the rail 14 or directly welded to the rail 14. In another alternative configuration, not specifically shown, the bracket 410 can include a third leg that is similar to the second leg 434, but extends down from the opposite end of the first leg 430. A second magnet (not shown) can be mounted to a distal end of the third leg (not shown) generally below the rail 14 and on an opposite side of the rail 14 as the magnet 426. In another alternative configuration, not specifically shown, the magnet 426 can be mounted within the rail 14, such as within the main channel 322 or within the mounting channel 338, and the target 30 can be a ferromagnetic portion of the trolley 18 that comes within the magnetic field of the magnet 426.

Figure 7:
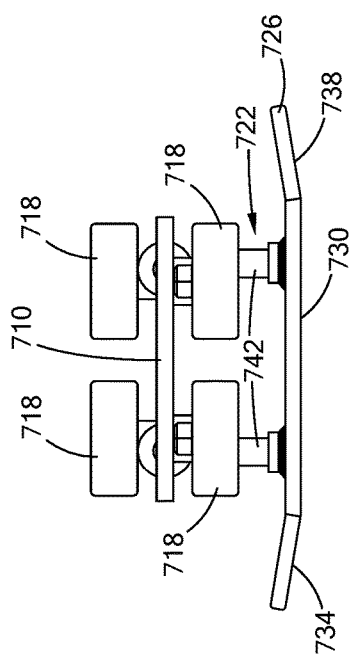
FIG. 7 is a top view of a trolley of the tool system of FIG. 1.
Figure 9:
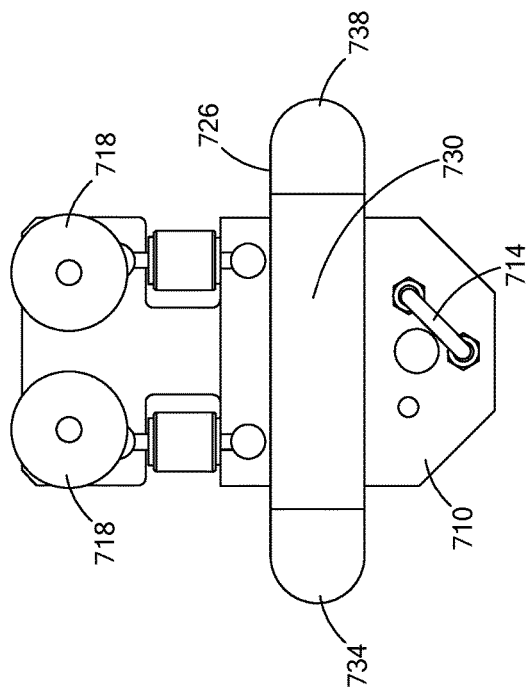
FIG. 9 is a side view of the trolley of FIG. 7.
Figure 8:
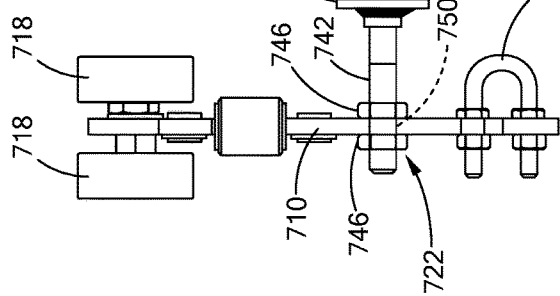
FIG. 8 is a front view of the trolley of FIG. 7.

With additional reference to FIGS. 7-9, the first trolley 18 and the target 30 are shown in greater detail. The first trolley 18 includes a trolley body 710, a mounting member 714, and a plurality of wheels 718. The wheels 718 are rotatably mounted to the trolley body 710. In the example provided, the first trolley 18 includes four of the wheels 718, with two of the wheels 718 on one side of the trolley body 710 and two of the wheels 718 on the opposite side of the trolley body 710, though other numbers of wheels or configurations can be used. The wheels 718 can be mounted to the trolley body 710 in any suitable manner for rotation relative to the trolley body 710, such as by bearings (not shown) for example. The mounting member 714 is fixedly coupled to the trolley body below the wheels 718 and configured to permit attachment of the lead 34 and support cable 78 to the first trolley 18.

With specific reference to FIG. 5, the wheels 718 are disposed within the main channel 322 of the rail 14 with two of the wheels 718 in rolling contact with one lower support surface 326 and two of the wheels 718 in rolling contact with the other lower support surface 330. The trolley body 710 extends down from the main channel 322 and through the opening 334 at the bottom of the rail 14.

The target 30 is generally mounted to the trolley body 710 below the wheels 718 and above the mounting member 714 in a location that is outside of the rail 14 and below the rail 14. With renewed attention to FIGS. 7-9, the target 30 includes a target bracket 722, and a target body 726. In the example provided, the target body 726 includes a main portion 730, a first transition portion 734, and a second transition portion 738. The target bracket 722 is mounted to the trolley body 710 and the main portion 730 of the target body 726 is mounted to the target bracket 722. The first and second transition portions 734, 738 are on opposite longitudinal ends of the main portion 730. In the example provided, target body 726 has a generally uniform thickness along its length, though other configurations can be used. The main portion 730 is generally parallel to the trolley body 710, while the first and second transition portions 734, 738 generally extend at angles back toward the trolley body 710.

As best shown in FIG. 3, the main portion 730 can be generally parallel to the rail axis 58, while the first and second transition portions 734, 738 can extend from the main portion 730 toward the rail axis 58. In the example provided, the target body 726 is formed of a single, ferromagnetic material. Since the distance between the magnet 426 (FIG. 5) and the target body 726 varies along the transition portions 734, 738, the holding force can vary along the length of the transition portions 734, 738. Thus, as the first trolley 18 approaches the detent 26 from either direction, the holding force can gradually increase until the main portion 730 aligns with the magnet 426.

In an alternative configuration, not shown, the target body 726 can be a magnet (e.g., a permanent magnet or an electromagnet) configured to be attracted to the magnet 426 of the detent 26. In another alternative configuration, not shown, the positions of the target body 726 and the magnet 426 can be reversed, such that the magnet 426 is mounted to the first trolley 18, while the target body 726 is mounted to the second leg 434 of the bracket 410. In another configuration, not shown, a bracket similar to the target bracket 722 can be mounted to the distal end 446 of the second leg 434 so that the distance between the rail axis 58 and the magnet 426 located on the second leg 434 can be adjusted without moving the entire bracket 410.

With renewed attention to FIGS. 7-9, the target bracket 722 is mounted to the trolley body 710 in a manner that permits the horizontal distance between the target body 726 and the trolley body 710 to be adjustable. In the example provided, the target bracket 722 includes a pair of threaded rods 742, and four nuts 746. One end of each threaded rode 742 is fixedly attached to a back side of the target body 726. In the example provided, the ends of the threaded rods 742 are welded to the back side of the main portion 730. Each threaded rode 742 extends through a corresponding hole 750 (only one shown in FIG. 8) in the trolley body 710. Each of the holes 750 has a diameter similar to, but slightly larger than the major diameter of the threads of the threaded rods 742 so that the threaded rods 742 are configured to slide along their axes relative to the trolley body 710. Two of the nuts 746 are threaded on each of the threaded rods 742, with one nut being on a front side of the trolley body 710 and the other nut being on the back side of the trolley body 710.

Thus, the horizontal position of the target body 726 can be adjusted incrementally by turning the nuts 746 on the threaded rods 742, or by loosening the nuts 746, sliding the threaded rods 742 to a desired location relative to the trolley body 710, and then retightening the nuts 746 against the trolley body 710. With specific reference to FIG. 5, the horizontal distance between the target body 726 and the rail axis 58, and thus the distance between the target body 726 and the magnet 426, can be adjusted by adjustment of the target bracket 722.

Returning to FIGS. 1 and 2, the second and third trolleys 42, 46 can be constructed similarly to the first trolley 18 shown in FIGS. 7-9 and described above. Accordingly, their descriptions are not repeated herein in detail. In the example provided, the second and third trolleys 42, 46 are similar to the first trolley 18, but do not include the target 30. In an alternative configuration, not specifically shown, the second trolley 42 and/or the third trolley 46 can include the target 30.

Figure 10:
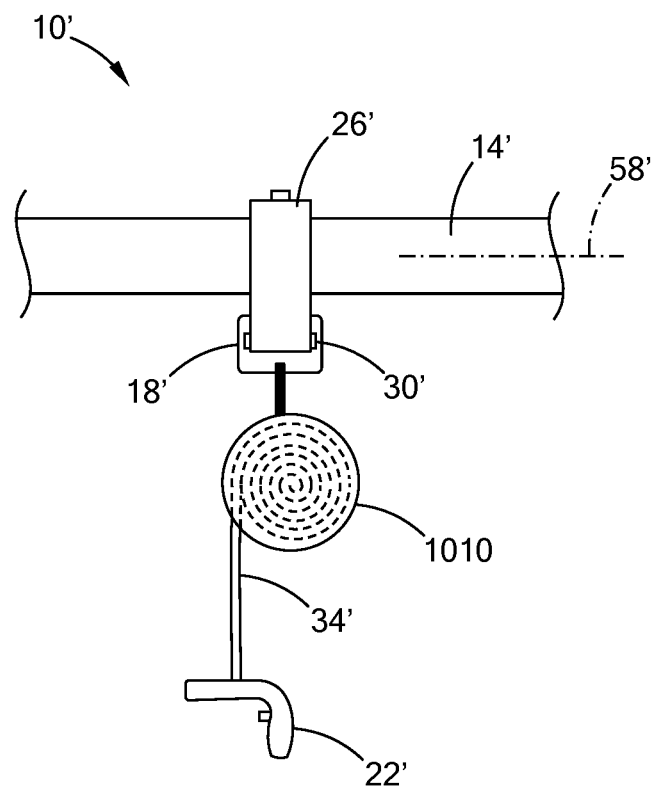
FIG. 10 is a tool system of a second construction in accordance with the teachings of the present disclosure.

With further reference to FIG. 10, a portion of a tool system 10' of a second configuration is illustrated. The tool system 10' can be similar to the tool system 10 (FIGS. 1-9) except as otherwise shown or described herein. Accordingly, similar elements are denoted with similar but primed reference numerals and only differences are described herein in detail. In general, the tool system 10' includes a rail 14', a trolley 18', a tool 22', a lead 34', a positioning device or detent 26', and a target 30'. In the example provided, the tool system 10' does not include the second or third trolleys 42, 46 (FIGS. 1 and 3). In the example provided, the lead 34' extends from a force balancing device 1010 that is attached to the trolley 18'. In the example provided, the force balancing device 1010 is a sprung spool, though other types of force balancing devices (e.g., torque tubes) can be used. The force balancing device 1010 can be configured to allow the tool 22 to hang in effectively zero g (e.g., effectively allowing the operator to raise and lower the tool without needing to overcome the weight of the tool or any parts attached to the tool). The tool 22' can be any suitable type of tool, but in the example provided, the tool 22' is configured to grab and move objects (not shown) that would otherwise be undesirably heavy for an operator (not shown) to lift.

Figure 12:
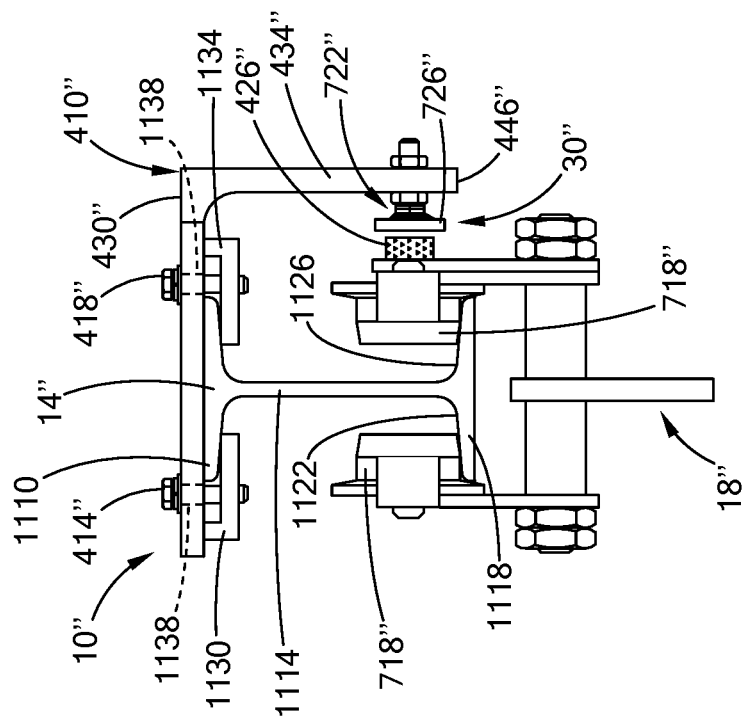
FIG. 12 is a cross-sectional view of the portion of the tool system shown in FIG. 11, taken along line 12-12 shown in FIG. 11.
Figure 11:
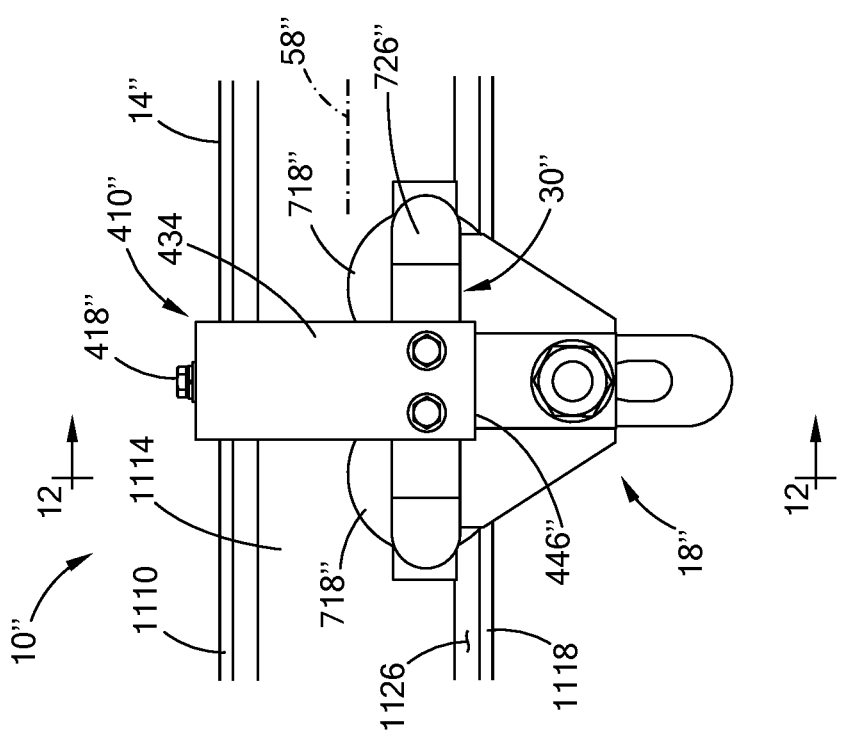
FIG. 11 is a side view of a portion of a tool system of a third construction in accordance with the teachings of the present disclosure.

With additional reference to FIGS. 11 and 12, a portion of a tool system 10" of a third configuration is illustrated. The tool system 10" can be similar to the tool system 10 (FIGS. 1-9) and 10' (FIG. 10) except as otherwise shown or described herein. Accordingly, similar elements are denoted with similar but double primed reference numerals and only differences are described herein in detail. In this configuration, the rail 14" is an I-beam style rail having a top member 1110, a middle member 1114, and a bottom member 1118. The top member 1110 extends generally parallel bottom member 1118 and the middle member 1114 extends between and connects the top and bottom member 1110, 1118 generally at their mid-points. The bottom member 1118 has support surfaces 1122, 1126 that are separated by the middle member 1114 and generally face upwards toward the top member 1110. The trolley 18" is similar to the first trolley 18 (FIGS. 1-10), except that the wheels 718" are situated on opposite sides of the middle member and roll along the support surfaces 1122, 1126. The bracket 410" can be mounted (e.g., clamped, welded, or bolted) to the top member 1110.

In the example provided, the bracket 410" is clamped by the bolts 414", 418" and clamp members 1130, 1134 to the top member 1110. The clamp members 1130 and 1134 each have a threaded bore and extend toward the middle member 1114 to overlap with the top member 1110. In the example provided, the first leg 430" of the bracket 410" includes non-threaded bores 1138 and the shafts of the bolts 414", 418" extend through the bores 1138 and are threaded into the clamp members 1130, 1134 so that tightening of the bolts 414", 418" causes the head of the bolts 414", 418" clamp down on the top surface of the first leg 430" and the threads pull the clamp members 1130, 1134 up to clamp on the top member 1110. In an alternative configuration, not shown, the bracket 410" can be directly bolted to the top member 1110 if the top member includes threaded bores, or the top member 1110 can include unthreaded bores and at least one nut can be used on the bottom side of the top member 1110 to bolt the bracket 410" to the rail 14".

In the example provided, the magnet 426" is mounted to the trolley 18" and the target 30" is mounted to the distal end 446" of the second leg 434". The target 30" includes the target bracket 722" and the target body 726". The target bracket 722" mounts the target body 726" to the distal end 446" of the second leg 434" and permits the horizontal distance between the target body 726" and the magnet 426" to be adjusted.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tool system comprising:
    a rail;
    a trolley translatable between first and second positions along the rail;
    a tool secured to the trolley;
    a detent including a magnet; and
    a target, one of the target and the magnet at a third position along the rail, between the first and second positions, the other one coupled to the trolley, the magnet and target cooperating to resist trolley movement away from the third position.

2. The tool system of claim 1, wherein the magnet does not contact the target when the trolley is in the third position.

3. The tool system of claim 1, wherein the detent includes a bracket and the magnet is mounted to the bracket, wherein the rail extends longitudinally along a rail axis and the bracket is configured to be adjustable between a first bracket position and a second bracket position, wherein when in the second bracket position the bracket supports the magnet a greater distance from the rail axis than when in the first bracket position.

4. The tool system of claim 3, wherein the target is mounted to the trolley, wherein the detent includes a fastener that couples the bracket to the rail, wherein the bracket defines a slot and the rail includes a nut, the fastener being received through the slot and threadably engaged with the nut.

5. The tool system of claim 3, wherein the target is mounted to the rail, wherein the bracket includes a threaded shaft and a nut, the threaded shaft supporting the magnet, wherein relative rotation between the threaded shaft and the nut translates the magnet relative to the trolley in a direction toward or away from the rail axis.

6. The tool system of claim 1, wherein the target includes a bracket and a ferromagnetic target member, wherein the rail extends longitudinally along a rail axis and the bracket is configured to be adjustable between a first bracket position and a second bracket position, wherein when in the second bracket position the bracket supports the target member a greater distance from the rail axis than when in the first bracket position.

7. The tool system of claim 6, wherein the detent is mounted to the trolley, wherein the target includes a fastener that couples the bracket to the rail, wherein the bracket defines a slot and the rail includes a nut, the fastener being received through the slot and threadably engaged with the nut.

8. The tool system of claim 6, wherein the detent is mounted to the rail, wherein the bracket includes a threaded shaft and a nut, the threaded shaft supporting the target member, wherein relative rotation between the threaded shaft and the nut translates the target member relative to the trolley in a direction toward or away from the rail axis.

9. The tool system of claim 1, wherein the rail extends longitudinally along a rail axis and the rail defines a channel extending longitudinally along the rail axis, the channel being open on a first side of the rail, wherein the trolley includes a plurality of wheels and a support body, the wheels being disposed within the channel and coupled to the support body for rotation relative to the support body, the support body extending from the channel through the first side of the rail, the tool being coupled to the support body.

10. The tool system of claim 9, wherein the one of the target and the detent is located within the channel.

11. The tool system of claim 1, wherein the rail is an I-beam.

12. The tool system of claim 1, wherein the rail extends longitudinally along a rail axis, wherein the target includes a ferromagnetic main portion and a ferromagnetic transition portion, the main portion extending generally parallel to the rail axis, the transition portion being fixedly coupled to an end of the main portion and extending therefrom in a direction away from the rail axis.

13. The tool system of claim 1, wherein the target includes a magnet configured to interact with the magnet of the detent when the trolley is in the third position.

14. The tool system of claim 1, further comprising a lead secured to the trolley, the tool being secured to an end of the lead.

15. The tool system of claim 14 further comprising:
a second trolley translatable along the rail, the lead being attached to the second trolley.

16. The tool system of claim 14, wherein a first end of the lead is secured to the tool, a second end of the lead is fixed relative to the rail, and the lead is attached to the trolley at an intermediate portion of the lead.

17. A tool system comprising:
a rail extending longitudinally along a rail axis;
a trolley coupled to the rail and translatable along the rail between a first position along the rail and a second position along the rail;
a lead attached to the trolley;
a tool secured to the lead;
a magnet;
a ferromagnetic target member; and
a first bracket coupled to the rail at a third position along the rail, the third position being between the first and second positions, the first bracket supporting one of the target member and the magnet and adjustable between a first bracket position wherein the one of the target member and the magnet is a first distance from the rail axis and a second bracket position wherein the one of the target member and the magnet is a second distance from the rail axis;
wherein the other one of the target member and the magnet is coupled to the trolley, the magnet and the target member cooperating to magnetically resist movement of the trolley away from the third position along the rail.

18. The tool system of claim 17, further comprising a plurality of fasteners that secure the first bracket to the rail, wherein the first bracket defines a slot and the rail includes a nut, the fasteners being threadably engaged with the nut.

19. The tool system of claim 17, further comprising a second bracket coupled to the trolley and supporting the other one of the target member and the magnet, the second bracket being adjustable to move the other one of the target member and the magnet between a third distance from the rail axis and a fourth distance from the rail axis.

20. The tool system of claim 19, wherein the second bracket includes a threaded shaft and a nut, the threaded shaft supporting the other one of the target member and the magnet, wherein relative rotation between the threaded shaft and the nut translates the other one of the target member and the magnet relative to the trolley in a direction toward or away from the rail axis.

* * * * *